United States Patent
Kawamura

(10) Patent No.: US 9,902,421 B2
(45) Date of Patent: Feb. 27, 2018

(54) WORM REDUCTION GEAR AND STEERING MECHANISM

(71) Applicant: JTEKT CORPORATION, Osaka-shi, Osaka (JP)

(72) Inventor: Naofumi Kawamura, Kishiwada (JP)

(73) Assignee: JTEKT CORPORATION, Osaka-shi (JP)

( * ) Notice: Subject to any disclaimer, the term of this patent is extended or adjusted under 35 U.S.C. 154(b) by 20 days.

(21) Appl. No.: 15/133,790

(22) Filed: Apr. 20, 2016

(65) Prior Publication Data

US 2016/0318544 A1 Nov. 3, 2016

(30) Foreign Application Priority Data

Apr. 30, 2015 (JP) ................................ 2015-093284

(51) Int. Cl.
| | |
|---|---|
| *B62D 5/04* | (2006.01) |
| *F16H 55/24* | (2006.01) |
| *F16H 1/16* | (2006.01) |
| *F16H 57/021* | (2012.01) |
| *F16H 57/039* | (2012.01) |
| *F16H 57/12* | (2006.01) |

(52) U.S. Cl.
CPC ......... *B62D 5/0409* (2013.01); *B62D 5/0454* (2013.01); *F16H 1/16* (2013.01); *F16H 55/24* (2013.01); *F16H 57/021* (2013.01); *F16H 57/039* (2013.01); *F16H 57/12* (2013.01); *F16H 2057/0213* (2013.01); *F16H 2057/127* (2013.01)

(58) Field of Classification Search
CPC ....... B62D 5/0454; B62D 5/0409; F16H 1/16; F16H 57/021
See application file for complete search history.

(56) References Cited

U.S. PATENT DOCUMENTS

| | | | | |
|---|---|---|---|---|
| 6,705,176 | B2 * | 3/2004 | Ishii ..................... | B62D 5/0409 74/388 PS |
| 7,360,467 | B2 * | 4/2008 | Segawa ................ | B62D 5/0409 180/444 |
| 7,614,317 | B2 * | 11/2009 | Sickert ................... | B62D 3/123 29/525.12 |
| 9,505,433 | B2 * | 11/2016 | Kimoto ................ | B62D 5/0454 |
| 2007/0205039 | A1 * | 9/2007 | Imagaki ............... | B62D 5/0409 180/444 |

(Continued)

FOREIGN PATENT DOCUMENTS

| | | |
|---|---|---|
| EP | 1637769 A1 | 3/2006 |
| JP | 2002-067992 A | 3/2002 |

OTHER PUBLICATIONS

Sep. 16, 2016 Extended Search Report issued in European Patent Application No. 16167035.

*Primary Examiner* — Kevin Hurley
(74) *Attorney, Agent, or Firm* — Oliff PLC

(57) ABSTRACT

In a worm reduction gear, a second bearing that supports a second end of a worm shaft and a guide member are housed in a holding hole in a housing. A bias member biases the second end of the worm shaft toward the worm wheel (in a second direction). The guide member is elastically fitted in the holding hole in the housing to guide movement of the second end via the second bearing. A slit is fanned in the guide member. Stress is relieved which is exerted on the guide member when the guide member is elastically fitted in the holding hole.

8 Claims, 10 Drawing Sheets

(56) References Cited

U.S. PATENT DOCUMENTS

| | | | |
|---|---|---|---|
| 2007/0251758 A1* | 11/2007 | Segawa | B62D 5/0409 180/444 |
| 2010/0243367 A1* | 9/2010 | Suzuki | B62D 5/0409 180/444 |
| 2013/0075189 A1* | 3/2013 | Sekikawa | B62D 5/0409 180/444 |
| 2014/0083794 A1* | 3/2014 | Ishii | B62D 5/0409 180/444 |
| 2014/0174843 A1* | 6/2014 | Kimoto | B62D 5/0424 180/444 |
| 2016/0068184 A1* | 3/2016 | Kimoto | B62D 5/0454 180/444 |
| 2016/0176438 A1* | 6/2016 | Suzuki | B62D 5/0403 180/444 |
| 2016/0319906 A1* | 11/2016 | Kawamura | F16H 57/12 |
| 2016/0368528 A1* | 12/2016 | Shiina | B62D 3/04 |

* cited by examiner

WORM REDUCTION GEAR AND STEERING MECHANISM

INCORPORATION BY REFERENCE

The disclosure of Japanese Patent Application No. 2015-093284 filed on Apr. 30, 2015 including the specification, drawings and abstract, is incorporated herein by reference in its entirety.

BACKGROUND OF THE INVENTION

1. Field of the Invention

The invention relates to a worm reduction gear and a steering system.

2. Description of the Related Art

In a worm reduction gear in an electric power steering system that transmits a rotating output from an electric motor to a steering shaft, a worm shaft coupled to the electric motor so as to be driven by the electric motor is meshed with a worm wheel coupled to the steering shaft. Various structures have been proposed in which a bearing supporting an end of the worm shaft is biased toward the worm wheel by a bias member, in order to suppress possible backlash between the worm shaft and the worm wheel (see, for example, Japanese Patent Application Publication No. 2002-67992 (JP 2002-67992 A).

In JP 2002-67992 A, movement of the end of the worm shaft is guided by a cylindrical guide member press-fitted in a fitting hole in a housing and disposed around the bearing. The guide member is formed of a material such as a synthetic resin.

The press fitting causes a relatively high stress to be exerted on the guide member. Long-term use of the guide member in this state causes the guide member to be subjected to creep and plastically deformed. This may reduce a holding force that allows the guide member to be held in the fitting hole.

SUMMARY OF THE INVENTION

An object of the invention is to provide a worm reduction gear and a steering system that suppresses a reduction in a holding force that allows a guide member to be held in a holding hole.

According to an aspect of the invention, a worm reduction gear includes: a housing with a holding hole formed therein; a worm shaft including a first end coupled to an electric motor and a second end positioned on the opposite side of the worm shaft from the first end in an axial direction, the worm shaft being housed in the housing; a worm wheel that meshes with the worm shaft; a first bearing held by the housing to support the first end so that the first end is rotatable; a second bearing that supports the second end so that the second end is rotatable; a bias member that directly or indirectly biases the second end toward the worm wheel; and a guide member having a slit and elastically fitted in the holding hole in the housing to directly or indirectly guide movement of the second end.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
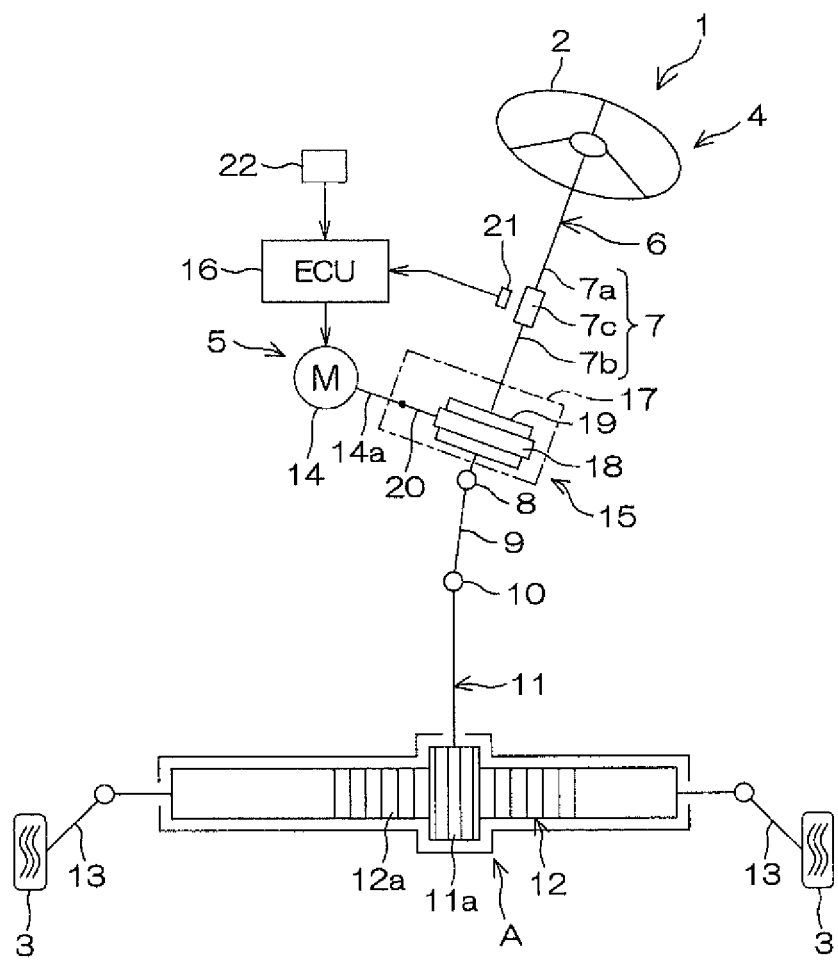
FIG. 1 is a schematic diagram depicting a general configuration of an electric power steering system to which a worm reduction gear in a first embodiment of the invention is applied.

Embodiments of the invention will be described below in accordance with the drawings. An electric power steering system including a worm reduction gear in a first embodiment of the invention will be described using FIG. 1, FIG, 1 is a schematic diagram depicting a general configuration of the electric power steering system in the first embodiment of the invention.

An electric power steering system 1 includes a steering mechanism 4 and a steering operation mechanism A to steer steered wheels 3 based on a driver's operation of a steering wheel (steering member). The steering mechanism 4 includes an assist mechanism 5 that assists the driver's steering operation. The steering mechanism 4 has an input shaft 7a, an output shaft 7b, an intermediate shaft 9, and a pinion shaft 11. The input shaft 7a is coupled to the steering wheel 2 (steering member). The output shaft 7b is coupled to the input shaft 7a via a torsion bar 7c. The intermediate shaft 9 is coupled to the pinion shaft 11 with a pinion 11a via a universal joint 8.

The steering operation mechanism A includes a rack shaft 12 and tie rods 13. The rack shaft 12 has a rack 12a meshed with the pinion 11a. Each of the tie rods 13 is coupled to the rack shaft 12 at one end of the tie rod 13 and to a corresponding one of the steered wheel 3 at the other end of the tie rod 13. When the steering wheel 2 rotates in accordance with the driver's operation of the steering wheel 2, the pinion shaft 11 rotates via the input shaft 7a, the output shaft 7b, and the intermediate shaft 9. Rotation of the pinion shaft 11 is converted into reciprocating motion of the rack shaft 12 in an axial direction by the steering operation mechanism A. Reciprocating motion of the rack shaft 12 changes the steered angle of the steered wheels 3.

The assist mechanism 5 has a torque sensor 21, an electronic control unit (ECU) 16, an electric motor 14, and a worm reduction gear 15. The torque sensor 21 detects the amount of torsion between the input shaft 7a and the output shaft 7b. The ECU 16 determines an assist torque based on the steering torque obtained from the amount of torsion detected by the torque sensor 21 and a vehicle speed detected by a vehicle speed sensor not depicted in the drawings. The electric motor 14 is controllably driven by the ECU 16. The worm reduction gear 15 transmits a rotational force of the electric motor 14 to the output shaft 7b. As a result, the assist torque is applied to the output shaft 7b to assist the driver's steering operation.

Figure 2:
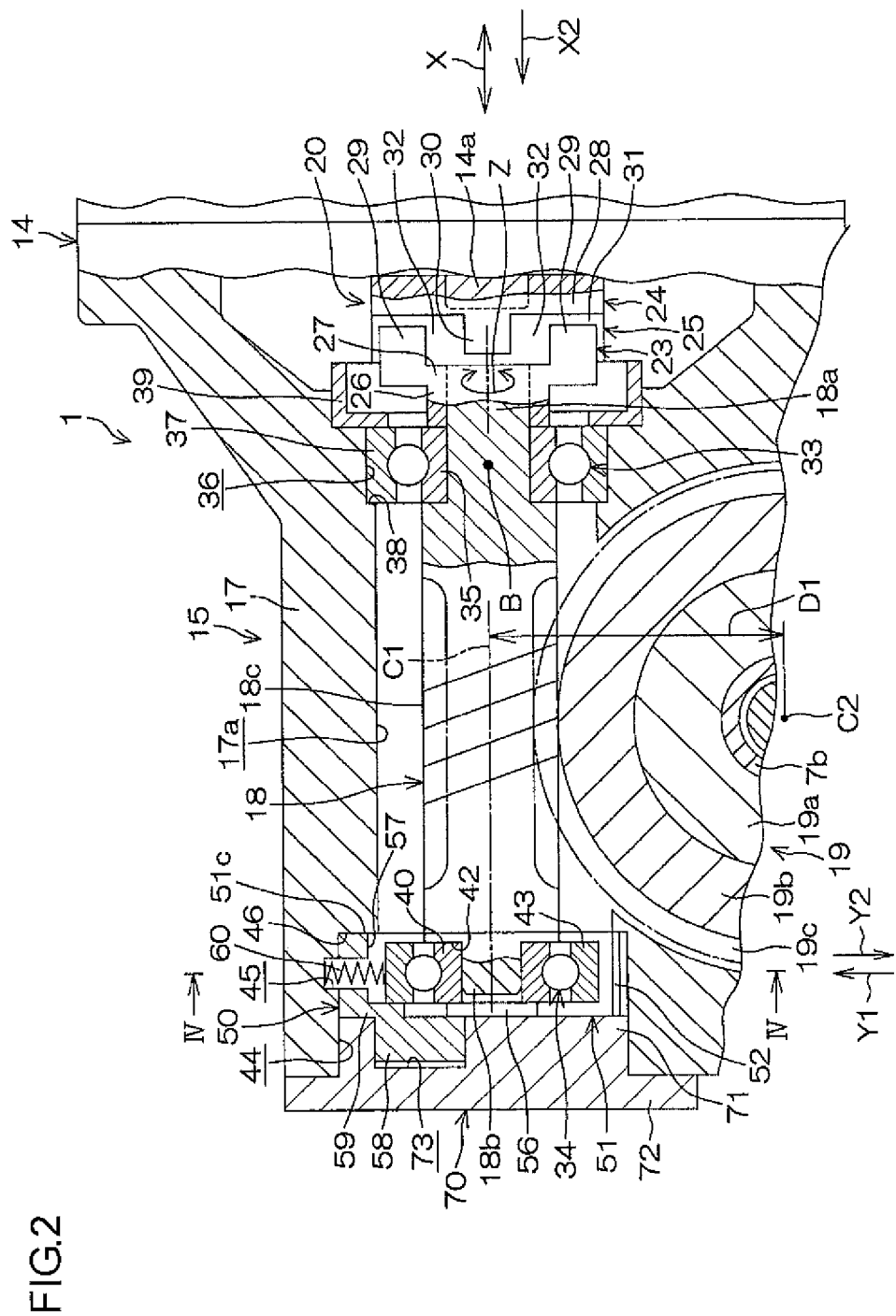
FIG. 2 is a sectional view of a main part of the worm reduction gear in the first embodiment.

The worm reduction gear in the first embodiment of the invention will be described using FIG. 2. FIG. 2 is a sectional view of a main part of the worm reduction gear in the first embodiment of the invention. The worm reduction gear 15 has a housing 17, a worm shaft 18, a first bearing 33, a second bearing 34, a worm wheel 19, and a bias portion as depicted in FIG. 2. The worm shaft 18, the first bearing 33, the second bearing 34, the worm wheel 19, and the bias portion are housed in the housing 17.

The worm shaft 18 has a first end 18a and a second end 18b that are separate from each other in the axial direction and a tooth portion 18e positioned midway between the first end 18a and the second end 18b. The worm shaft 18 is housed in a housing portion 17a of the housing 17. The worm shaft 18 is disposed coaxially with an output shaft 14a of the electric motor 14. The first end 18a of the worm shaft 18 faces an end of the output shaft 14a of the electric motor 14 in an axial direction X. The first end 18a of the worm shaft 18 and an end of the output shaft 14a of the electric motor 14 are coupled together via a power transmission coupling 20 so that torque can be transmitted between the first end 18a and the output shaft 14a.

The power transmission coupling 20 has a first rotation element 23, a second rotation element 24, and an inteiniediate element 25. The first rotation element 23 is fixed to the first end 18a of the worm shaft 18 so as to be rotatable integrally with the worm shaft 18. The second rotation element 24 is fixed to the end of the output shaft 14a of the electric motor 14 so as to be rotatable integrally with the output shaft 14a. The first rotation element 23 has a plurality of engaging protrusions 29 protruding toward the second rotation element 24 in the axial direction X. The engaging protrusions 29 are disposed in a rotating direction Z (corresponding to a circumferential direction) at intervals in the rotating direction Z. The second rotation element 24 has a plurality of engaging protrusions 30 protruding toward the first rotation element 23 in the axial direction X.

The engaging protrusions 30 are disposed in the rotating direction Z (corresponding to the circumferential direction) at intervals in the rotating direction Z. The engaging protrusions 29 of the first rotation element 23 and the engaging protrusions 30 of the second rotation element 24 are alternately disposed at intervals in the rotating direction Z.

The intermediate element 25 includes a plurality of engaging protrusions 32 extending radially outward in a radial manner. Each of the engaging protrusions 32 is disposed between the corresponding engaging protrusion 29 of the first rotation element 23 and the corresponding engaging protrusion 30 of the second rotation element 24 in the rotating direction Z. Thus, a torque of the output shaft 14a of the electric motor 14 is transmitted to the worm shaft 18 via the second rotation element 24, the intermediate element 25, and the first rotation element 23. In addition, the intermediate element 25 is formed of an elastic member. Consequently, the first rotation element 23 is configured to be able to swing with respect to the second rotation element 24. That is, the worn shaft 18 is coupled to the output shaft 14a of the electric motor 14 so as to be able to swing.

The worm wheel 19 has a core portion 19a and a tooth portion 19b. The core portion 19a is formed of, for example, a metal material and is annularly shaped. The core portion 19a is fitted over an outer periphery of the output shaft 7b and rotates integrally with the output shaft 7b. The tooth portion 19b is formed of, for example, a resin material and is annularly shaped. The invention is not limited to a column assist type in the present embodiment in which the torque of the electric motor 14 is applied to the output shaft 7b, located upstream of the pinion shaft 11. For example, the invention may be of a pinion assist type in which the torque of the electric motor 14 is applied to the pinion shaft 11. In this case, the worm wheel 19 is fixed to the pinion shaft 11.

The tooth portion 19b is fitted over an outer periphery of the core portion 19a and rotates integrally with the core portion 19a. On an outer peripheral surface of the tooth portion 19b, teeth 19c are formed which mesh with teeth of the tooth portion 18c of the worm shaft 18. The first bearing 33 includes, for example, a rolling bearing, The first bearing 33 has an inner ring 35, an outer ring 37, and a plurality of rolling elements. The inner ring 35 is fitted over an outer periphery of the first end 18a of the worm shaft 18 and rotates integrally with the worm shaft 18. The outer ring 37 is fitted in a bearing hole 36 formed in the housing 17. The outer ring 37 is sandwiched, in the axial direction, between a positioning step portion 38 located at an end of the bearing hole 36 and a stopper member 39 screw-threaded in the bearing hole 36. The first bearing 33 has an internal clearance.

In the present embodiment, the intermediate element 25 of the power transmission coupling 20 is formed of an elastic member, and slight clearances are set between each of the roller elements and the inner ring 35 and the outer ring 37. Thus, the worm shaft 18 is supported using a center B of the first bearing 33 as a support, so as to be able to swing with respect to the housing 17. The second bearing 34 includes, for example, a rolling bearing. The second bearing 34 has an inner ring 40, an outer ring 43, and a plurality of rolling elements. The second bearing 34 is housed in a holding hole 44 in the housing 17. The inner ring 40 is fitted over the second end 18b of the worm shaft 18 and rotates integrally with the worm shaft 18. One end face of the inner ring 40 is in abutting contact with a positioning step portion 42 formed at the second end 18b of the worm shaft 18.

Figure 3:
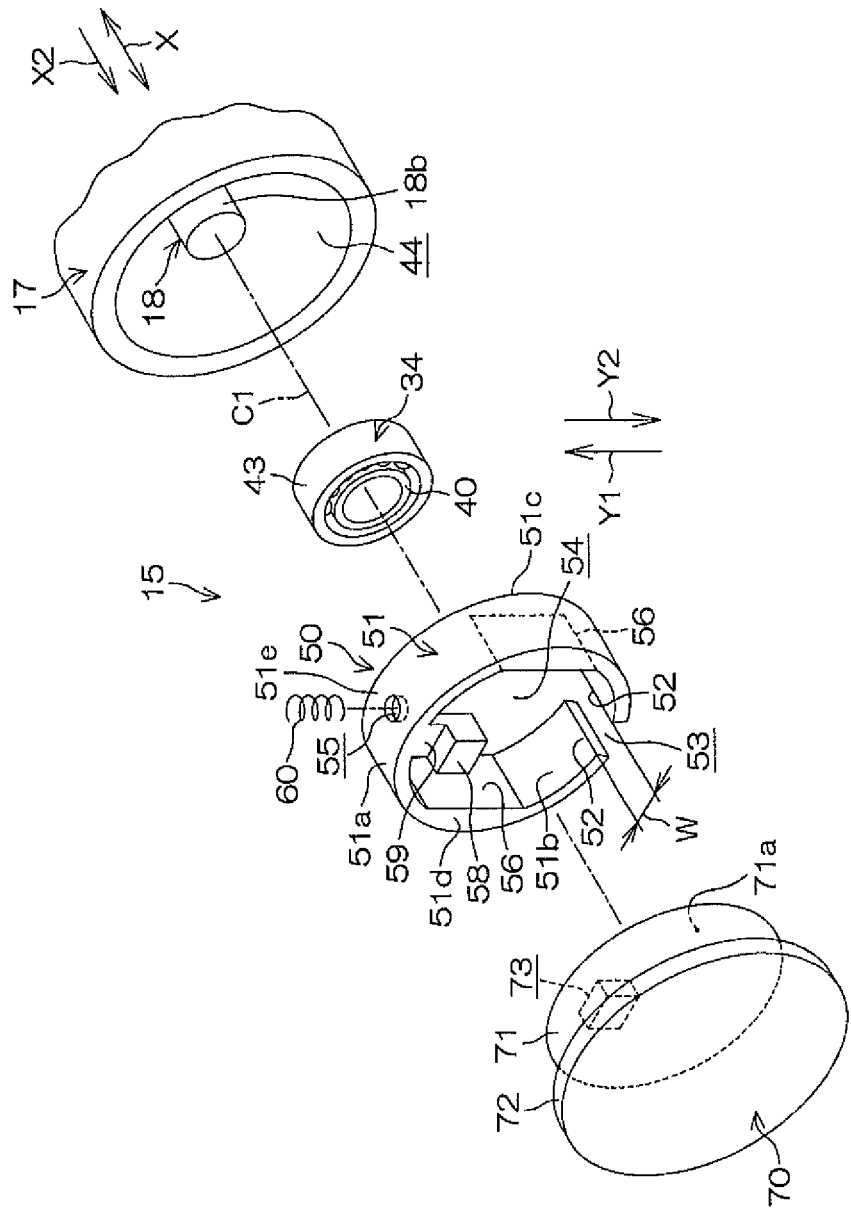
FIG. 3 is an exploded perspective view of a main part of the worm reduction gear in the first embodiment.
Figure 4:
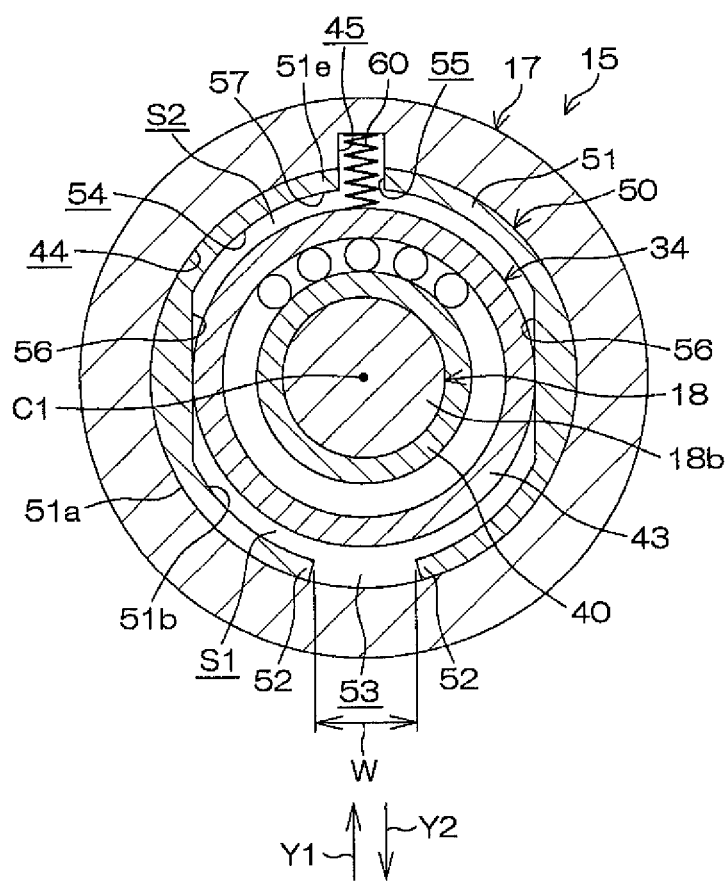
FIG. 4 is a sectional view taken along line IV-IV in FIG. 2.

The bias portion of the worm reduction gear in the first embodiment of the invention will be described in detail using FIGS. 2 to 4. FIG. 3 is an exploded perspective view of a main part of the worm reduction gear in the first embodiment. FIG. 4 is a sectional view taken along line IV-IV in FIG. 2. As depicted in FIG, 2, the bias portion in the first embodiment includes a guide member 50 and a bias member 60. The guide member 50 is disposed around the second bearing 34. The guide member 50 guides movement of the second end 18b of the worm shaft 18 via the second bearing 34, The bias member 60 is formed of a spring member, for example, a compression coil spring. To make the worm shaft 18 closer to the worm wheel 19, the bias member 60 biases the second end 18b of the worm shaft 18 toward the worm wheel 19 with respect to the housing 17 using the center B of the first bearing 33 as a support. In the housing 17, a holding hole 44 is formed which is a through-hole extending in the axial direction X and communicating with the housing portion 17a. The guide member 50 and the second bearing 34 are housed in the holding hole 44, As depicted in FIG. 3, the guide member 50 and the second bearing 34 are assembled into the housing 17 through the opening of the holding hole 44. As depicted in FIG. 2, the opening of the holding hole 44 is closed by a cover member 70. The cover member 70 is fixedly press-fitted in the holding hole 44. As depicted in FIG. 2 and FIG. 3, the cover member 70 includes a body 71 and a flange 72. The body 71 is, for example, cylindrically shaped and press-fitted in the holding hole 44. The flange 72 protrudes radially outward from one end of the body 71. The flange 72 covers an opening edge of the holding hole 44.

The guide member 50 disposed around the second bearing 34 is elastically fitted in the holding hole 44 in the housing 17. The guide member 50 is formed of a resin material, for example, polyamide. Specifically, as depicted in FIG. 3 and FIG. 4, the guide member 50 includes a C-shaped fitting portion 51 fitted in the holding hole 44. The fitting portion 51 has an outer surface 51a and an inner surface 51b. The fitting portion 51 has a first end face 51c and a second end face 51d. The second end face 51d is positioned on the opposite side of the fitting portion 51 from the first end face 51c in the axial direction X (on an outer side X2 of the worm shaft 18 in the axial direction).

The C-shaped fitting portion 51 includes a pair of circumferential ends 52. A slit 53 is formed between the circumferential ends 52. The C-shaped fitting portion 51 can be elastically reduced in diameter by decreasing a width W of the slit 53 (a distance between the circumferential ends 52). The outside diameter of the fitting portion 51 in a free state is larger than the bore diameter of the holding hole 44. Thus, the fitting portion 51 with the diameter thereof elastically reduced is fitted in the holding hole 44.

The fitting portion 51 applies, to an inner periphery of the holding hole 44, a pressing force resulting from an elastic repulsive force in a direction in which the diameter of the holding hole 44 is increased. The fitting portion 51 is subjected to a reaction force to the pressing force from the inner periphery of the holding hole 44. The fitting portion 51 gains a holding force that allows the fitting portion 51 to be held, as a result of the reaction force to the pressing force of the fitting portion 51. The holding force corresponds to a contact load acting between the outer surface 51a of the fitting portion 51 and the inner periphery of the holding hole 44. Changing the width W of the slit 53 allows relief of stress resulting from elastic fitting of the fitting portion 51 of the guide member 50 into the holding hole 44. Changing the width W of the slit 53 allows absorption of a change such as expansion and contraction of the guide member 50 caused by a change in temperature.

The inner surface 51b of the fitting portion 51 defines a guide hole 54 serving as a guide space through which the second bearing 34 is guided. The guide hole 54 is formed like a bias hole in which the second bearing 34 is held such that the second end 18b of the worm shaft 18 is movable in a first direction Y1 and in a second direction Y2. The guide hole 54 is open in the second direction Y2 via a slit 53. As depicted in FIG. 2, the first direction Y1 is a direction in which a center-to-center distance D1 between the worm shaft 18 and the worm wheel 19 (corresponding to a distance between a central axis Cl of the worm shaft 18 and a central axis C2 of the worm wheel 19) increases. The second direction Y2 is a direction in which the center-to-center distance D1 between the worm shaft 18 and the worm wheel 19 decreases. The second direction Y2 corresponds to a biasing direction of the bias member 60. The first direction Y1 corresponds to a direction opposite to the biasing direction of the bias member 60.

As depicted in FIG. 3 and FIG. 4, the fitting portion 51 has a first-direction-side end 51e provided on a first direction Y1 side of the fitting portion 51. The first-direction-side end 51e faces the slit 53 in a radial direction of the fitting portion 51. The first-direction-side end 51e has an insertion hole 55 penetrating the outer surface 51a and the inner surface 51b. A part of the bias member 60 is inserted and held in the insertion hole 55.

The guide member 50 includes a pair of guide portions 56. The guide portions 56 are provided on the inner surface 11b of the fitting portion 51 (corresponding to an inner periphery forming the guide hole 54). The guide portions 56 include a pair of flat surfaces extending parallel to the first direction Y1 and the second direction Y2. The guide portions 56 contact an outer periphery of the outer ring 43 of the second bearing 34 to provide a first function, a second function, and a third functions. The first function is a function to guide movement of the second bearing 34 in the first direction Y1 and in the second direction Y2. The second function is a function to regulate rotation of the outer ring 43 of the second bearing 34. The third function is a function to regulate movement of the second bearing 34 in a direction orthogonal to the first direction Y1 and the second direction Y2.

A clearance S1 is formed between the outer ring 43 of the second bearing 34 and a portion of an inner surface of the guide member 50 (the inner surface 51b of the fitting portion 51) that is close to the worm wheel 19. The clearance Si allows the worm shaft 18 to be constantly biased toward the worm wheel 19, for example, even if the tooth portion 19b of the worm wheel 19 is worn off As depicted in FIG. 4, the guide member 50 includes a stopper portion 57 that regulates a distance that the second end 18b of the worm shaft 18 moves away from the worm wheel 19 (in the first direction Y1). The stopper portion 57 is provided on the inner surface 51b of the fitting portion 51 at the first-direction-side end 51e thereof.

Normally, a clearance S2 is formed in the first direction Y1 between the stopper portion 57 and the outer ring 43 of the second bearing 34. When, for example, the vehicle travels on a rough road, the abutting contact between the stopper portion 57 and the outer ring 43 regulates excessive movement of the second end 18b of the worm shaft 18 in the first direction Y1, On the inner periphery of the holding hole 44 in the housing 17, a holding recessed portion 45 is formed which is recessed in the first direction Y1 as depicted in FIG. 2 and FIG. 4. A circumferential position of the guide member 50 with respect to the holding hole 44 is determined so that the holding recessed portion 45 of the housing 17 communicates with the insertion hole 55 in the guide member 50. The cover member 70 contributes to positioning of the guide member 50 in the circumferential direction. That is, as depicted in FIG. 2, the guide member 50 is engaged with the cover member 70 fixedly press-fitted in the housing 17 such that a recessed portion and a protruding portion of the guide member 50 fit a protruding portion and a recessed portion, respectively, of the cover member 70. As depicted in FIG. 2 and FIG. 3, a protruding portion 58 provided on the guide member 50 engages with a recessed portion 73 formed in the cover member 70. The engagement between the protruding portion 58 and the recessed portion 73 allows the guide member 50 to be positioned in a circumferential direction of the holding hole 44 to regulate rotation of the guide member 50 in the circumferential direction of the holding hole 44, The guide member 50 has an extension portion 59 that extends radially inward from the inner surface 51b of the fitting portion 51. The protruding portion 58 protrudes from the extension portion 59 toward the cover member 70. On the other hand, the recessed portion 73 of the cover member 70 is formed on an end face 71a of the body 71 that is on the opposite side of the cover member 70 from the flange 72 in the axial direction X. As depicted in FIG. 2 and FIG. 4, the bias member 60 is inserted and held in the holding recessed portion 45 in the housing 17 and in the insertion hole 55 in the guide member 50. The bias member 60 is compressed and interposed between the holding recessed portion 45 and the outer ring 43 of the second bearing 34 to bias the second bearing 34 in the second direction Y2. The bottom of the holding recessed portion 45 functions as a receiving seat on which one end of the bias member 60 (a first direction Y1-side end of the bias member 60) is seated. An inner wall surface of the holding recessed portion 45 functions as a guide for that end of the bias member 60.

As depicted in FIG. 2, the housing 17 includes a positioning portion 46 that allows the guide member 50 to be positioned in the axial direction X of the worm shaft 18. The positioning portion 46 is, for example, a step portion formed on the inner periphery of the holding hole 44. The positioning portion 46 comes into abutting contact with the first end face 51c of the fitting portion 51 of the guide member 50 to position the guide member 50 in the axial direction X. In the first embodiment, the guide member 50, which guides movement of the second end 18b of the worm shaft 18, is elastically fitted in the holding hole 44 in the housing 17. The slit 53 is formed in the guide member 50. This allows relief of stress exerted on the guide member 50 when the guide member 50 is elastically fitted into the holding hole 44. Consequently, possible creep on the guide member 50 is suppressed for a long period of time to suppress a reduction in the holding force that allows the guide member 50 to be held in the holding hole 44.

The guide member 50 uses the elastic repulsive force thereof to gain the holding force that allows the guide member 50 to be held in the holding hole 44. Thus, compared to a configuration in which another member is used to hold the guide member 50 in the holding hole 44, the worm reduction gear of the first embodiment has a simple structure with a reduced number of components. The guide member 50 has the C-shaped fitting portion 51 elastically fitted in the holding hole 44. The C-shaped fitting portion 51 is subjected to low stress during elastic deformation. This further suppresses possible creep on the guide member 50. The C-shaped fitting portion 51 provides a large margin for elastic deformation without the need to increase the stress. Consequently, even when the fitting portion 51 of the guide member 50, formed of resin, is contracted by a change in temperature, the holding force allowing the guide member 50 to be held in the holding hole 44 can be appropriately ensured.

Even if slight creep occurs on the guide member 50 due to long-term use under a high-temperature condition, the C-shaped fitting portion 51, which provides a large margin for elastic deformation, can suppress a decrease in the holding force allowing the guide member 50 to be held in the holding hole 44. Since the guide member 50 is formed of resin, it is possible to suppress rattle resulting from contact between the guide member 50 and another member (for example, a metal member such as the outer ring 43 of the second bearing 34).

The recessed portion 73 of the cover member 70 held by the housing 17 engages with the protruding portion 58 of the guide member 50 to regulate rotation of the guide member 50 in the circumferential direction of the holding hole 44. Thus, possible wear of the guide member 50 is suppressed which is caused by backlash of the guide member 50 in the rotating direction. In particular, possible wear of the outer surface 51a of the fitting portion 51 is suppressed, so that it is possible to suppress a decrease in the holding force that allows the guide member 50 to be held in the holding hole 44.

The stopper portion 57 of the guide member 50 regulates the distance that the second end 18b of the worm shaft 18 moves away from the worm wheel 19 (in the first direction Y1). Specifically, when the worm shaft 18 is removed from the worm wheel 19 as a result of, for example, vibration during traveling on a rough road, the stopper portion 57 comes into abutting contact with the outer ring 43 of the second bearing 34. Thus, the second end 18b of the worm shaft 18 is restricted from moving excessively in the first direction Y1. This suppresses degradation of the bias member 60 and the worm wheel 19.

Figure 5:
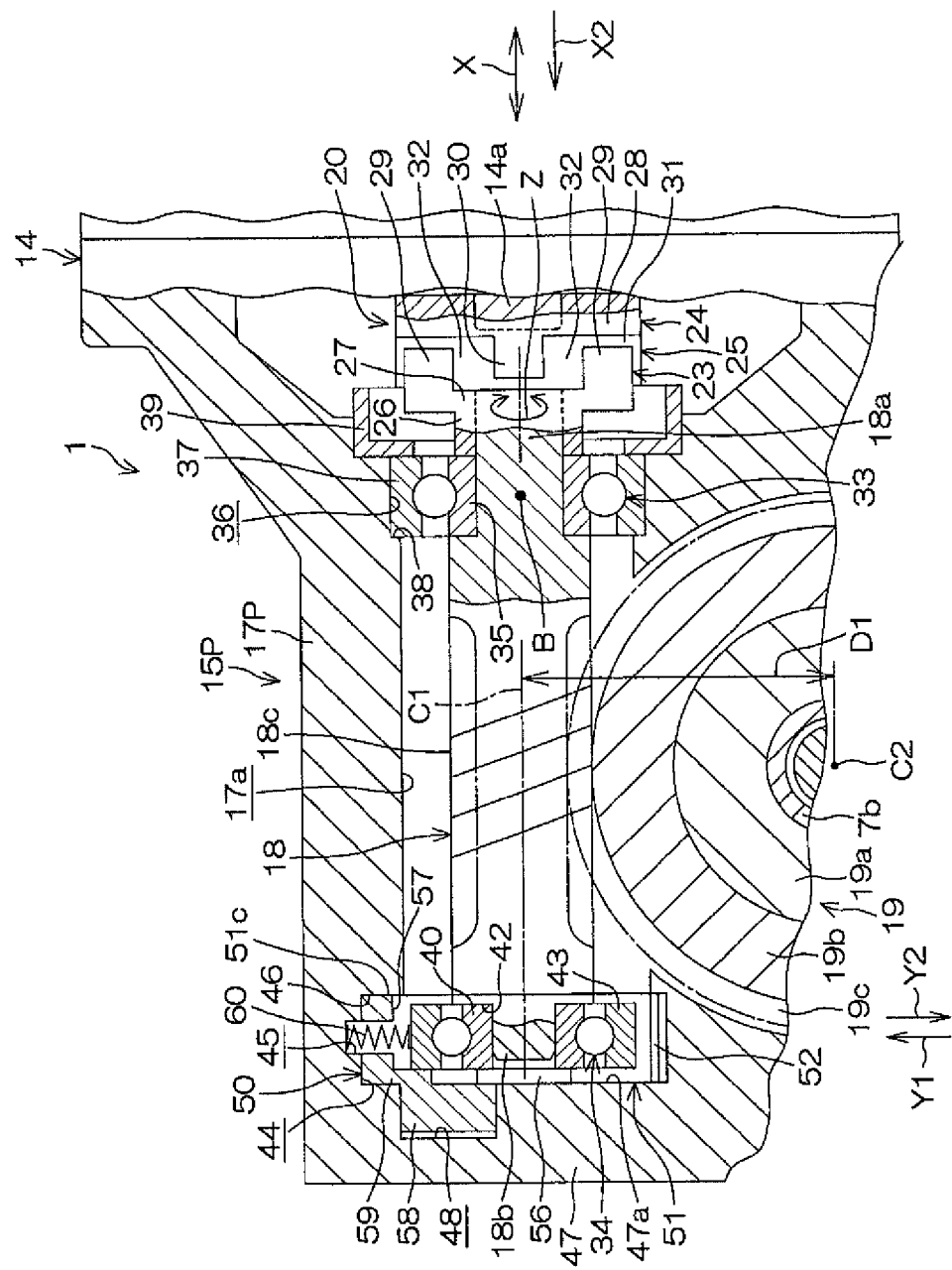
FIG. 5 is a sectional view of a main part of a worm reduction gear in a second embodiment of the invention.

The positioning portion 46 provided in the holding hole 44 in the housing 17 allows the guide member 50 to be positioned in the axial direction X of the worm shaft 18. Thus, possible wear of the guide member 50 is suppressed which is caused by backlash of the guide member 50 in the axial direction X. In particular, possible wear of the outer surface 51a of the fitting portion 51 is suppressed to suppress a decrease in the holding force that allows the guide member 50 to be held in the holding hole 44. FIG. 5 is a sectional view of a main part of a worm reduction gear in a second embodiment of the invention. A worm reduction gear 15P in the second embodiment in FIG. 5 is mainly different from the worm reduction gear 15 in the first embodiment in FIG. 2 as follows.

That is, a housing 17P has an end wall 47 that closes one end of the holding hole 44. Thus, the guide member 50 and the second bearing 34 are assembled into the holding hole 44 by being inserted from the electric motor 14 side into the holding hole 44 through the housing portion 17a. A recessed portion 48 is formed in an inner surface 47a of the end wall 47. Rotation of the guide member 50 in the circumferential direction of the holding hole 44 is regulated by engagement between the recessed portion 48 of the end wall 47 and the protruding portion 58 of the guide member 50.

Figure 6:
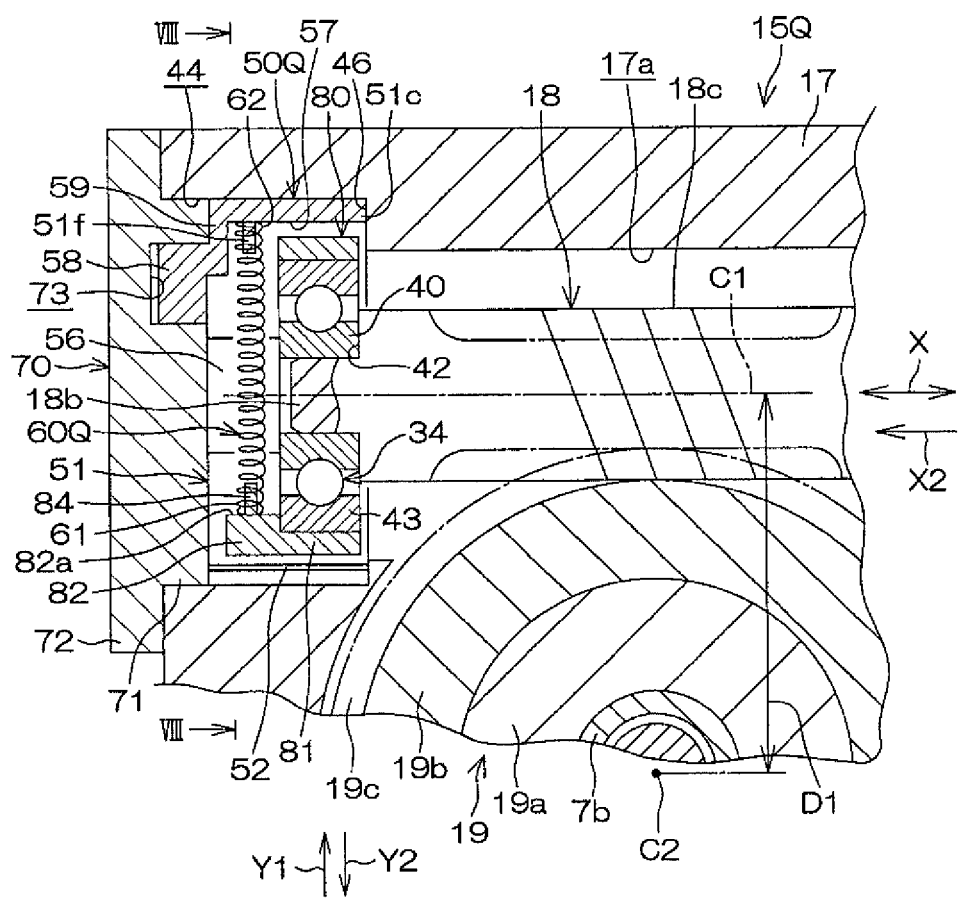
FIG. 6 is a sectional view of a main part of a worm reduction gear in a third embodiment of the invention.
Figure 7:
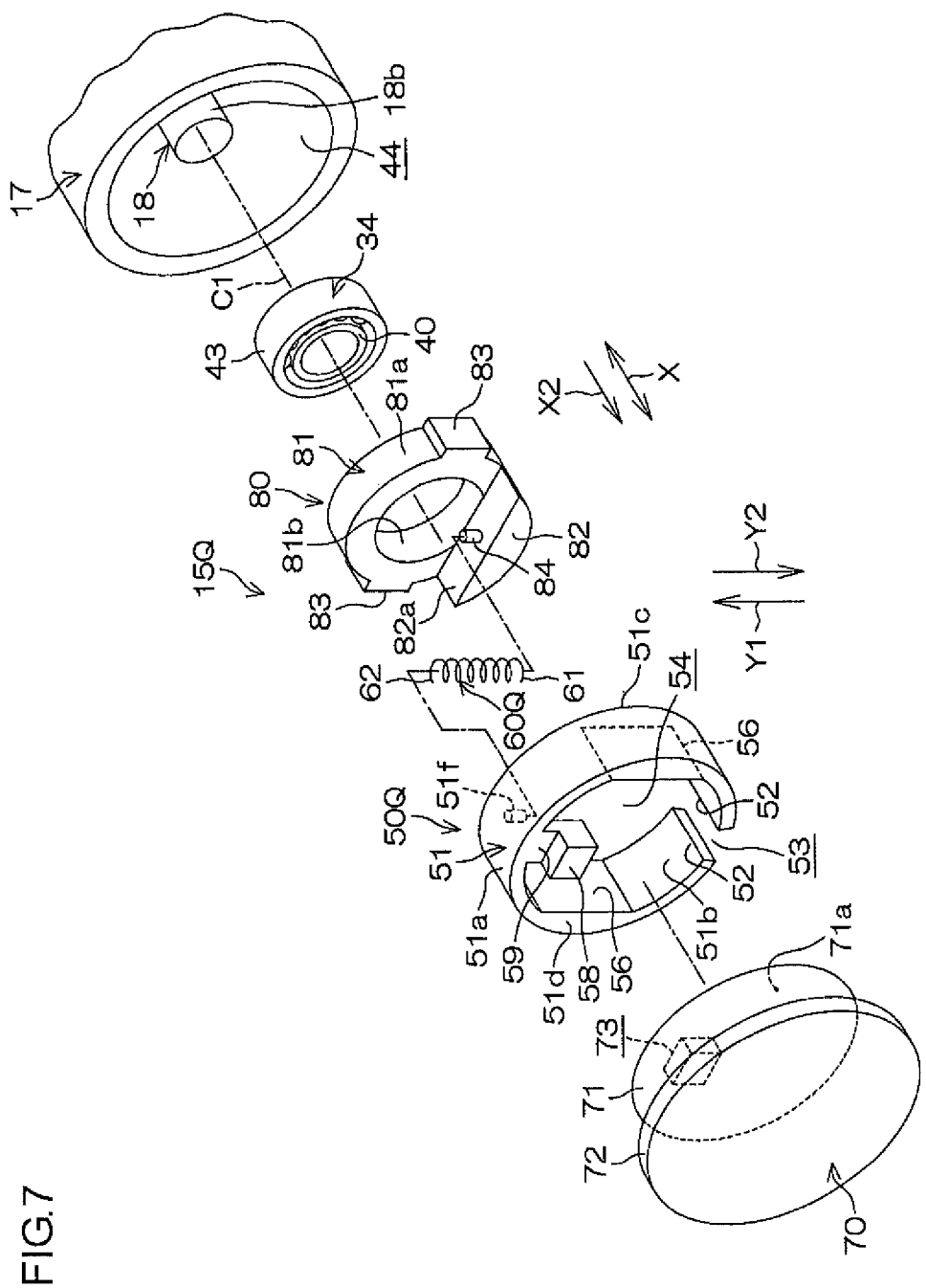
FIG. 7 is an exploded perspective view of a main part of the worm reduction gear in the third embodiment.
Figure 8:
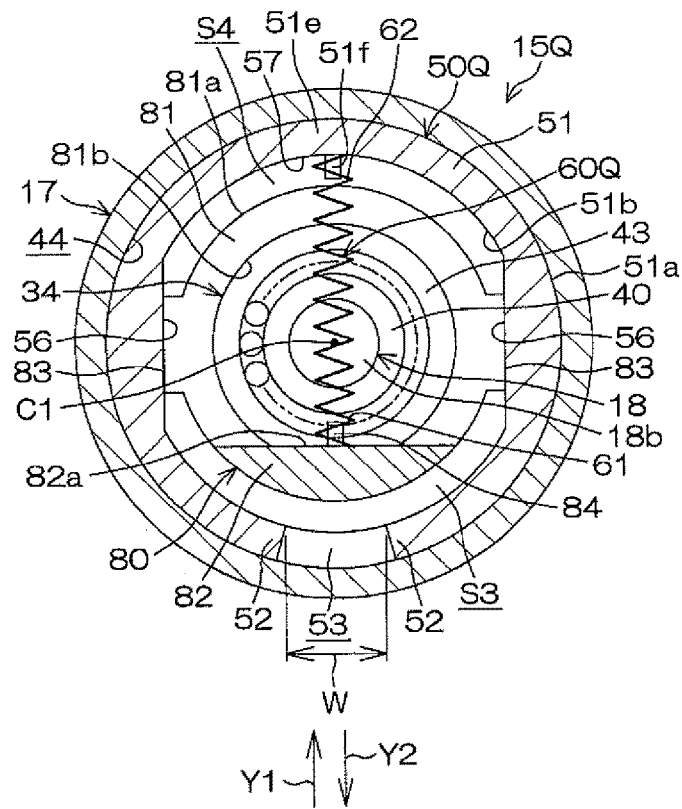
FIG. 8 is a sectional view taken along line VIII-III in FIG. 6.
Figure 9:
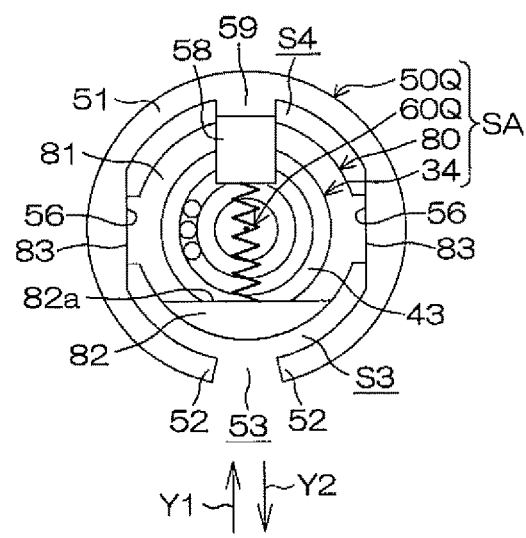
FIG. 9 is a schematic front view of a subassembly of the worm reduction gear in the third embodiment.

Components of the second embodiment which are the same as those of the first embodiment are denoted by the same reference numerals as those of the first embodiment. The second embodiment can produce the same effects as those of the first embodiment. The cover member can be omitted to reduce the number of components. FIG. 6 is a sectional view of a main part of a worm reduction gear 15Q in a third embodiment of the invention. FIG. 7 is an exploded perspective view of the bias portion of the worm reduction gear 15Q. FIG. 8 is a sectional view taken along line VIII-VIII in FIG. 6. FIG. 9 is a schematic front view of a subassembly SA of the worm reduction gear 15Q.

The worm reduction gear 15Q in the third embodiment in FIG. 6, FIG. 7, and FIG. 8 is mainly different from the worm reduction gear 15 in the first embodiment in FIG. 2, FIG. 3, and FIG, 4 as follows. As depicted in FIG. 6, the worm reduction gear 15Q includes a bearing holder 80 disposed around the second bearing 34. The second end 18b of the worm shaft 18 and the bearing holder 80 and a guide member 50Q move integrally in the first direction Y1 and in the second direction Y2.

As depicted in FIG. 7 and FIG. 8, the bearing holder 80 includes an annular body portion 81 and a receiving-seat forming portion 82 serving as a receiving-seat forming member. The outer ring 43 of the second bearing 34 is press-fitted on an inner periphery 81b of the body portion 81 of the bearing holder 80. A pair of guided portions 83 is provided on an outer periphery 81a of the body portion 81. The guided portions 83 are formed like flat surfaces parallel to the first direction Y1 and the second direction Y2.

The guide portions 56 of the guide member 50Q engage with the guided portions 83 of the bearing holder 80 to provide a first function, a second function, and a third function. The first function is a function to guide movement of the second bearing 34 in the first direction Y1 and in the second direction Y2 via the bearing holder 80. The second function is a function to regulate rotation of the outer ring 43 of the second bearing 34 via the bearing holder 80. The third function is a function to regulate movement of the second bearing 34 in a direction orthogonal to the first direction Y1 and the second direction Y2.

The receiving-seat forming portion 82 forms a receiving seat 82a on which a first end 61 of a bias member 60Q is seated. The receiving seat 82a is disposed on the outer side X2 of at least one of the second end 18b of the worm shaft 18 and the second bearing 34 in the axial direction. The bearing holder 80 including the receiving-seat forming portion 82 is provided integrally with the outer ring 43 of the second bearing 34 by being assembled to the outer ring 43, On the receiving seat 82a, a guide 84 is provided, for example, a spring guide that is a protruding portion. The guide 84, which is a protruding portion, is inserted into the first end 61 of the bias member 60Q. As the guide 84, a recessed portion that houses the first end 61 of the bias member 60Q may be formed in the receiving seat 82a (not depicted in the drawings). In the guide member 50Q in the third embodiment, the insertion hole 55, formed in the guide member 50 in the first embodiment, is omitted. As depicted in FIG. 8, the guide member 50Q has a receiving seat 51f that is provided on the inner surface 51b of the C-shaped fitting portion 51 and on which a second end 62 of the bias member 60Q is seated. The receiving seat 51f is a guide, for example, a spring guide that is a protruding portion. The receiving seat 51f, which is a protruding portion, is inserted into the second end 62 of the bias member 60Q. As the receiving seat 51f, a recessed portion that houses the second end 62 of the bias member 60Q may be formed in the inner surface 51b (not depicted in the drawings).

The bias member 60Q is adjacent to at least one of the second end 18b of the worm shaft 18 and the second bearing 34 in the axial direction X. The bias member 60Q is disposed between the housing 17 and the receiving seat 82a. Specifically, the bias member 60Q is disposed between the receiving seat 82a and the guide member 50Q held in the holding hole 44 in the housing 17. To make the worm shaft 18 closer to the worm wheel 19, the bias member 60Q biases the second end 18b of the worm shaft 18 via the receiving-seat forming portion 82 and the second bearing 34 with respect to the housing 17 (the guide member 50Q held in the housing 17).

A clearance S3 is formed between an outer surface of the bearing holder 80 (the outer periphery 81a of the body portion 81) and a portion of an inner surface of the guide member 50Q (the inner surface 51b of the fitting portion 51) that is close to the worm wheel 19 (a portion of the inner surface that includes the circumferential end 52).

The clearance S3 allows the worm shaft 18 to be constantly biased toward the worm wheel 19, for example, even if the tooth portion 19b of the worm wheel 19 is worn off, A clearance S4 is formed between a portion of an outer surface of the bearing holder 80 (the outer periphery 81a of the body portion 81) that is located away from the worm wheel 19 and the stopper portion 57 of the guide member 50Q, which faces the above-described portion of the outer surface of the bearing holder 80. Specifically, when the worm shaft 18 is thrown up from the worm wheel 19 as a result of, for example, vibration during traveling on a rough road, the stopper portion 57 regulates excessive movement of the bearing holder SO in the first direction Y1. This suppresses degradation of the bias member 60Q and the worm wheel 19. In the present embodiment, the guide member 50Q and the bearing holder 80 are formed of a resin material. Thus, abnormal noise is suppressed which is generated when the inner surface 51b of the fitting portion 51 of the guide member 50Q comes into contact with the bearing holder 80.

As depicted in FIG. 9, the guide member 50Q, the bias member 60Q, the bearing holder 80, and the second bearing 34 are assembled together. The subassembly SA is configured which includes the guide member 50Q, the bias member 60Q, the bearing holder 80, and the second bearing 34. During assembly of the worm reduction gear 15Q, the guide member 50Q, the bias member 60Q, the bearing holder 80, and the second bearing 34, which are collectively in the faint of the subassembly SA, are assembled into the holding hole 44 in the housing 17 through the opening of the holding hole 44. Thus, the worm reduction gear 15Q may be easily and efficiently assembled.

During assembly of the subassembly SA, with a spacer jig regulating the amount of clearance (not depicted in the drawings) inserted in the clearance S4, the second bearing 34 may be concentrically aligned on the second end 18b of the worm shaft 18 while the bias member 60Q is being deflected. After the assembly, the spacer jig is removed through the opening of the holding hole 44. The subassembly SA may be configured to include the guide member 50Q, the bias member 60Q, and the bearing holder 80, and may not include the second bearing 34.

The third embodiment can produce the same effects as those of the first embodiment. The bias member 60Q is disposed on the outer side X2 of the second end 18b of the worm shaft 18 and the second bearing 34 in the axial direction. This hinders an increase in the radial dimension of the worm reduction gear 15, allowing the worm reduction gear 15 to be easily and appropriately mounted in a vehicle or the like. Furthermore, a space in which the bias member 60Q is disposed can be more easily secured in an area located on the outer side X2 of the second end 18b of the worm shaft 18 and the second bearing 34 in the axial direction than in an area located a radially outer side of the second end 18b of the worm shaft 18. This provides a high degree of freedom in selection of the type of the bias member 60Q, a spring length, a spring constant, and the like.

Figure 10:
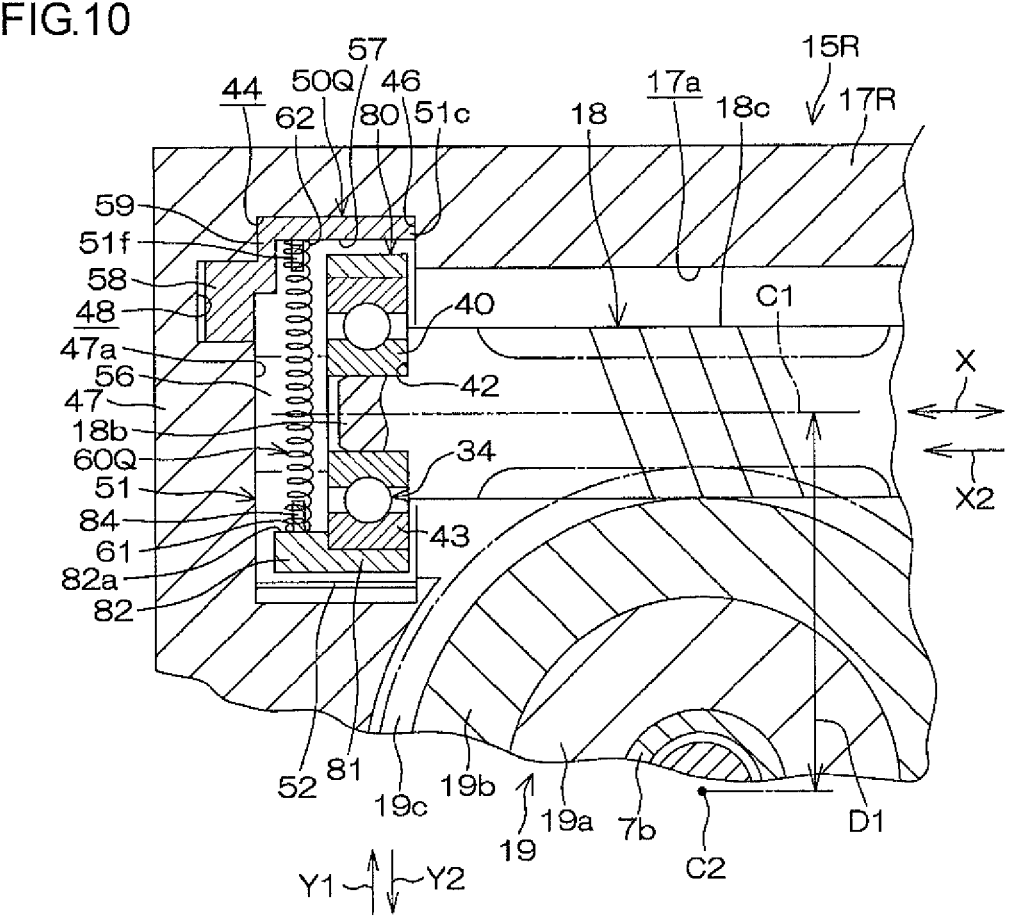
FIG. 10 is a sectional view of a main part of a worm reduction gear in a fourth embodiment of the invention.

In the present embodiment, the bias member 60Q biases the second end 18b of the worm shaft 18 via the receiving seat 82a (bearing holder 80) and the second bearing 34 instead of directly biasing the second end 18b of the worm shaft 18. Consequently, a loss torque is suppressed. FIG. 10 is a sectional view of a main part of a worm reduction gear in a fourth embodiment of the invention. A worm reduction gear 15R in the fourth embodiment in FIG. 10 is mainly different from the worm reduction gear 15R in the third embodiment in FIG. 6 as follows.

That is, a housing 17R has the end wall 47 that closes one end of the holding hole 44. Thus, the guide member 50Q, the bearing holder 80, and the second bearing 34 are assembled into the holding hole 44 by being inserted from the electric motor 14 side into the holding hole 44 through the housing portion 17a. The recessed portion 48 is formed in the inner surface 47a of the end wall 47. Rotation of the guide member 50Q in the circumferential direction of the holding hole 44 is regulated by engagement between the recessed portion 48 of the end wall 47 and the protruding portion 58 of the guide member 50Q.

Figure 11:
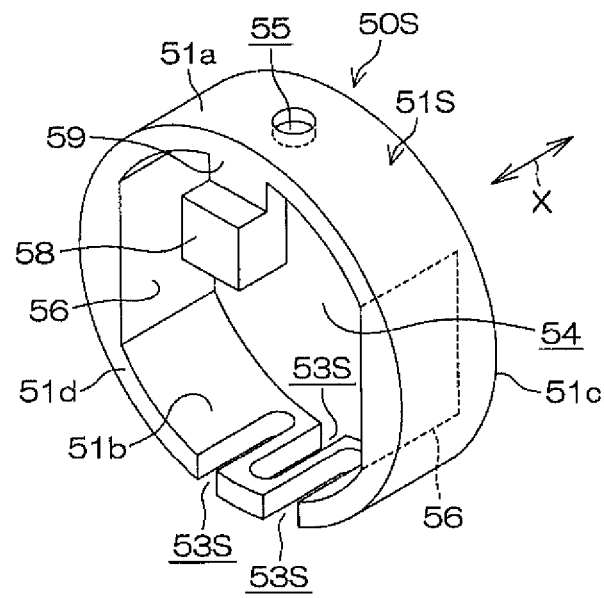
FIG. 11 is a schematic perspective view of a guide member according to a fifth embodiment of the invention.

Components of the fourth embodiment which are the same as those of the third embodiment are denoted by the same reference numerals as those of the third embodiment. The fourth embodiment can also produce the same effects as those of the third embodiment. The cover member can be omitted to reduce the number of components. FIG. 11 is a schematic perspective view of a guide member 60S according to a fifth embodiment of the invention. The guide member 60S in the fifth embodiment is different from the guide member 50 in the first embodiment in FIG. 3 as follows. That is, a fitting portion 51 S of the guide member 60S is formed as an annular body that is endless in the circumferential direction. In order to relieve stress from the guide member 60S, a plurality of slits 53S extending in the axial direction X is formed at intervals in a circumferential direction of the fitting portion 51S.

The slits 53S are aligned so as to alternately extend from the first end face 51c and the second end face 51d of the fitting portion 51S in the opposite directions in the axial direction X in a staggered manner. A portion of the fitting portion 51 S in which the slits 53S are aligned is continuous in a zigzag manner. Components of the fifth embodiment in FIG, 11 which are the same as those of the first embodiment in FIG. 3 are denoted by the same reference numerals as those of the first embodiment in FIG. 3.

Figure 12:
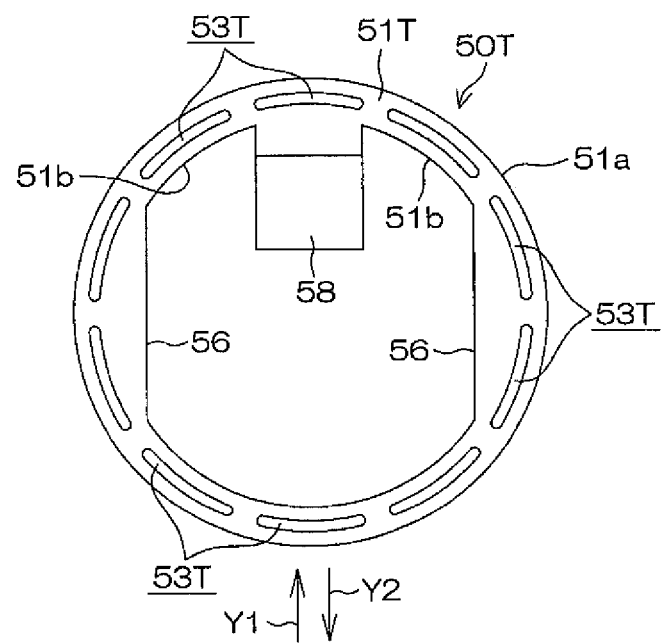
FIG. 12 is a schematic front view of a guide member according to a sixth embodiment of the invention.

In the fifth embodiment, the slits 53S are formed in the guide member 50S as is the case with the first embodiment. This allows relief of stress exerted on the guide member 50S when the guide member 50S is elastically fitted into the holding hole 44. Consequently, possible creep on the guide member 50S is suppressed for a long period of time to suppress a reduction in the holding force that allows the guide member 50S to be held in the holding hole 44. Although not depicted in the drawings, the configuration of the guide member 50S in the fifth embodiment may be applied to any of the first to fourth embodiments. FIG. 12 is a schematic front view of a guide member 50T according to a sixth embodiment of the invention. The guide member 50T in the sixth embodiment is different from the guide member 50 in the first embodiment in FIG. 3 as follows. That is, a fitting portion 51T of the guide member 50T is formed as an annular body that is endless in the circumferential direction. In order to release stress from the guide member 50T, a plurality of slits 53T extending in the circumferential direction is formed in the fitting portion 51T. The slits 53T are aligned in a circumferential direction of the fitting portion 51T. The slits 53T penetrate the fitting portion 51T, which is an annular body, in the axial direction (the direction orthogonal to the drawing plane of FIG. 12).

Components of the sixth embodiment in FIG. 12 which are the same as those of the first embodiment in FIG. 3 are denoted by the same reference numerals as those of the first embodiment in FIG. 3. In the sixth embodiment, the slits 53T are formed in the guide member 50T as is the case with the first embodiment. This allows relief of stress exerted on the guide member 50T when the guide member 50T is elastically fitted into the holding hole 44. Consequently, possible creep on the guide member 50T is suppressed for a long period of time to suppress a reduction in the holding force that allows the guide member 50T to be held in the holding hole 44.

Although not depicted in the drawings, the configuration of the guide member 50T in the sixth embodiment may be applied to any of the first to fourth embodiments. The invention is not limited to the above-described embodiments. The electric power steering system 1 may be an electric power steering system that applies power of the electric motor 14 to the pinion shaft 11.

What is claimed is:

1. A worm reduction gear comprising:
a housing with a holding hole formed therein;
a worm shaft including a first end coupled to an electric motor and a second end positioned on the opposite side of the worm shaft from the first end in an axial direction, the worm shaft being housed in the housing;
a worm wheel that meshes with the worm shaft;
a first bearing held by the housing to support the first end so that the first end is rotatable;
a second bearing that supports the second end so that the second end is rotatable;
a bias member that directly or indirectly biases the second end toward the worm wheel; and
a guide member having a slit and elastically fitted in the holding hole in the housing to directly or indirectly guide movement of the second end.

2. The worm reduction gear according to claim 1, wherein the guide member includes a C-shaped fitting portion that has a pair of circumferential ends between which the slit is formed, and that is elastically fitted in the holding hole.

3. The worm reduction gear according to claim 1, wherein the guide member is formed of resin.

4. The worm reduction gear according to claim 1, wherein a protruding portion provided on one of the guide member and the housing or a member held by the housing engages with a recessed portion formed in other of the guide member and the housing or the member held by the housing to regulate rotation of the guide member in a circumferential direction of the holding hole.

5. The worm reduction gear according to claim 1, wherein the guide member includes a stopper portion that regulates a distance that the second end moves away from the worm wheel.

6. The worm reduction gear according to claim 1, further comprising a positioning portion provided on the housing or a member held by the housing to position the guide member in the axial direction of the worm shaft.

7. The worm reduction gear according to claim 1, further comprising a receiving-seat forming member that forms a receiving seat disposed on an outer side of at least one of the second end and the second bearing in the axial direction and that is provided integrally with the outer ring of the second bearing, wherein
the bias member is disposed adjacent to at least one of the second end and the second bearing in the axial direction and between the housing and the receiving seat and is configured to bias the second end toward the worm wheel via the receiving-seat forming member and the second bearing.

8. A steering apparatus that transmits power of an electric motor to a steering shaft via the worm reduction gear according to claim 1.

* * * * *